United States Patent Office  3,118,880
Patented Jan. 21, 1964

3,118,880
9α-HALO-11-HYDROXY TESTOSTERONE AND INTERMEDIATES IN THE PRODUCTION THEREOF
Albert Wettstein and Georg Anner, Basel, and Charles Meystre, Arlesheim, Switzerland, assignors to Ciba Corporation, a corporation of Delaware
No Drawing. Filed May 18, 1955, Ser. No. 509,392
Claims priority, application Switzerland May 26, 1954
12 Claims. (Cl. 260—239.55)

This invention relates to $\Delta^4$-3-oxo-11,17-dihydroxy-17-R-9-halogeno-androstenes and esters and ethers, for example acetals, thereof, wherein R stands for hydrogen or a lower alkyl group, for example, methyl, and wherein halogeno stands for, for example, for bromine, chlorine, fluorine and iodine. Especially valuable are the aforesaid compounds where halogeno is chlorine and fluorine, for example, $\Delta^4$-3-oxo-11β,17β-dihydroxy-9α-chloro-androstene, $\Delta^4$-3-oxo-11β,17β-dihydroxy-9α-fluoro-androstene, $\Delta^4$-3-oxo-11β,17β-dihydroxy-17α-methyl-9α-chloro-androstene, $\Delta^4$-3-oxo-11β,17β-dihydroxy-17α-methyl-9α-fluoro-androstene and the esters thereof, for example, the 17β esters with carboxylic acids, e.g. propionic acid, cyclopentylpropionic acid, and the like.

The novel compounds of the present invention demonstrate valuable physiological activity. They possess the activity of testosterone and can be employed in the same way to treat the same conditions as is testosterone.

The novel compounds in which the halogeno radical is bromine are readily prepared by converting $\Delta^{4,9(11)}$-3-oxo-17-hydroxy-17-R-androstadiene, preferably in the form of the 17-ester thereof, more particularly $\Delta^{4,9(11)}$-3-oxo-17-acyloxy-17-R-androstadiene, into $\Delta^4$-3-oxo-11β-hydroxy-17-acyloxy-17-R-9α-bromo-androstene, for example, by treating the former with N-bromoacetamide or N-bromosuccinimide, preferably in the presence of a catalyst, such as sulfuric acid. The resulting $\Delta^4$-3-oxo--11β-hydroxy-17-acyloxy-17-R-9α-bromo-androstene can then be converted into $\Delta^4$-3-oxo-11β-hydroxy-17-acyloxy-17-R-9α-chloro-androstene and the corresponding 9α-fluoro compounds in the following manner:

The $\Delta^4$-3-oxo-11β-hydroxy-17-acyloxy-17-R-9α-bromo-androstene is treated with a dehydrobrominating agent, that is, an agent which splits off hydrogen bromide, to form $\Delta^4$-3-oxo-17β-acyloxy-17-R-9,11β-oxido-androstene which is then treated with hydrogen chloride to produce $\Delta^4$-3-oxo-11β-hydroxy-17-acyloxy-17-R-9α-chloro-androstene or with hydrogen fluoride to produce $\Delta^4$-3-oxo-11β-hydroxy-17-acyloxy-17-R-9α-fluoro-androstene. When hydrogen iodide is employed there is obtained $\Delta^4$-3-oxo-11β-hydroxy-17-acyloxy-17-R-9α-iodo-androstene.

As dehydrobrominating agents there can be employed advantageously hydroxides or oxides of metals of the first and second groups of the periodic system, for example, silver oxide, and also tertiary bases such as pyridine or collidine, or aluminum oxide. It is of advantage to use a tertiary base together with one of the aforesaid monovalent or divalent metal hydroxides or oxides.

The $\Delta^{4,9(11)}$-3-oxo-17-hydroxy-17-R-androstadiene and their esters employed as starting compounds, can be prepared by known methods, for example, by splitting off water from $\Delta^4$-3-oxo-11,17-dihydroxy-17-R-androstene or their 17-esters, for example by treating $\Delta^4$-3-oxo-11-hydroxy-17-acyloxy-17-R-androstene with phosphorus oxychloride and pyridine.

R in the above named compounds stands for hydrogen or a lower alkyl group, e.g., methyl.

The novel compounds comprising the invention can be employed in combination with any suitable carrier to facilitate the administration thereof.

The following examples will serve to illustrate the invention:

*Example 1*

A solution of 110 milligrams of $\Delta^{4,9(11)}$-3-oxo-17β-propionyloxy-androstadiene in 4.5 cc. of tertiary butanol and 1 cc. of water is mixed, while stirring, at about 15° C. with 120 milligrams of N-bromoacetamide and 1 cc. of sulfuric acid of 4 percent strength. After a few minutes the reaction solution becomes yellow-brown. For the purpose of decolorization an aqueous 1 percent solution of sodium sulfite is then added. 50 cc. of water are added, the mixture is extracted with a mixture of chloroform and ether (1:3), and the extract is washed with ice-cold dilute 1 percent sodium carbonate solution and water. By evaporating the dried chloroform-ether solution in vacuo there is obtained $\Delta^4$-3-oxo-11β-hydroxy-17β-propionyloxy-9α-bromo-androstene (9α-bromo-11β-hydroxy-testosterone propionate).

A solution of 100 milligrams of the above $\Delta^4$-3-oxo-11β-hydroxy-17β-propionyloxy-9α-bromo-androstene in 2 cc. of anhydrous pyridine is agitated in the dark for 24 hours with 150 milligrams of freshly precipitated and dried silver oxide. Silver oxide is then filtered off with suction, and the filtrate is evaporated in vacuo. The residue consists of $\Delta^4$-3-oxo-17β-propionyloxy-9,11β-oxido-androstene and $\Delta^4$-3-oxo-17β-hydroxy-9,11β-oxido-androstene, which can be separated by chromatography with the aid of aluminum oxide.

50 milligrams of $\Delta^4$-3-oxo-17β-propionyloxy-9,11β-oxido-androstene dissolved in 5 cc. of dioxane, are mixed with 1.2 cc. of 2.5 N-hydrochloric acid, and the whole is allowed to stand for one hour at room temperature. Water is then added, and the mixture is extracted with a mixture of chloroform and ether (1:3). After washing the extract with water, drying it and evaporating the solvent in vacuo, there is obtained $\Delta^4$-3-oxo-11β-hydroxy-17β-propionyloxy-9α-chloro-androstene.

By reacting the above 9,11β-oxido-compound with hydrofluoric acid there is obtained $\Delta^4$-3-oxo-11β-hydroxy-17β-propionyloxy-9α-fluoro-androstene.

In an analogous manner, for example, $\Delta^{4,9(11)}$-3-oxo-17β-cyclopentyl propionyloxy-androstadiene can be converted into $\Delta^4$-3-oxo-11β-hydroxy-17β-cyclopentylpropionyloxy-9α-chloro-androstene and $\Delta^4$-3-oxo-11β-hydroxy-17β-cyclopentylpropionyloxy-9α-fluoro-androstene.

*Example 2*

A solution of 200 milligrams of $\Delta^{4,9(11)}$-3-oxo-17β-hydroxy-17α-methyl-androstadiene in 10 cc. of tertiary butanol and 2 cc. of water are mixed, while stirring, at about 15° C. with 250 milligrams of N-bromacetamide and 2 cc. of sulfuric acid of 4 percent strength. The further procedure is analogous to that described in Example 1. The resulting $\Delta^4$-3-oxo-11β,17β-dihydroxy-17α-methyl-9α-bromo-androstene can be converted by the process described in Example 1 by way of $\Delta^4$-3-oxo-17β-hydroxy-17α-methyl-9,11β-oxido-androstene into $\Delta_4$-3-oxo 11β,17β-dihydroxy-17α-methyl-9α-chloro-androstene and $\Delta^4$-3-oxo-11β,17β-dihydroxy-17α-methyl-9α-fluoro-androstene.

The aforesaid $\Delta^4$-3-oxo-11,17-dihydroxy-17-R-9-halogeno-androstenes can be esterified, particularly in the 17-position to produce the corresponding 17-acyloxy compounds. For this purpose the customary reagents may be used, for example, carboxylic acid chlorides or carboxylic acid anhydrides or isopropenyl acylates, if desired, in approximately equivalent proportions. Thus, for example, the radicals of carboxylic acids containing up to and including eleven carbon atoms, e.g. acetic acid, trimethyl acetic acid, propionic acid, valeric acid, oenanthic acid, undecylenic acid, benzoic acid, phenylpropionic acid, cyclopentylpropionic acid, or of polycarboxylic acids, hydroxy-carboxylic acids, polyoxy-methylene-carboxylic acids, or inorganic acids, may be introduced to produce the corresponding 17-acyloxy compounds.

What is claimed is:

1. $\Delta^4$ - 3 - oxo-9α-halo-11β-hydroxy-17β-OR-17α-R₁-androstene, in which R is a member selected from the group consisting of hydrogen and acyl derived from a carboxylic acid having one to eleven carbon atoms and R₁ is selected from the group consisting of hydrogen and lower alkyl.
2. $\Delta^4$-3-oxo-11β,17-dihydroxy-9α-chloro-androstene.
3. $\Delta^4$-3-oxo-11β,17-dihydroxy-9α-fluoro-androstene.
4. $\Delta^4$ - 3 - oxo - 11β - hydroxy-17β-propionyloxy-9α-chloro-androstene.
5. $\Delta^4$ - 3 - oxo - 11β - hydroxy-17β-propionyloxy-9α-fluoro-androstene.
6. $\Delta^4$ - 3 - oxo - 11β - hydroxy - 17β - cyclopentylpropionyloxy-9α-chloro-androstene.
7. $\Delta^4$ - 3 - oxo - 11β,17β - dihydroxy-17α-methyl-9α-chloro-androstene.
8. $\Delta^4$ - 3 - oxo - 11β,17β - dihydroxy-17α-methyl-9α-fluoro-androstene.
9. 9α-halo-11β-hydroxytestosterone of the formula

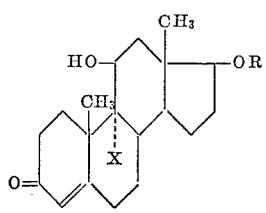

wherein X is a halogen and R is a member selected from the group consisting of hydrogen and lower alkanoyl.

10. 9α-halo-11β-hydroxy-17α-lower alkyl testosterone of the formula

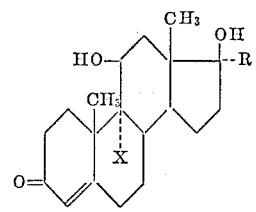

wherein X is a halogen and R is a lower alkyl radical.

11. 9,11β-epoxy-17-alkyltestosterones represented by the following formula

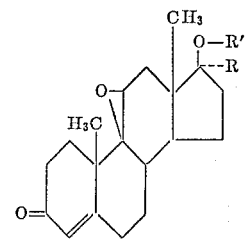

wherein R' is selected from the group consisting of hydrogen and the acyl radical of a hydrocarbon carboxylic acid containing from one to twelve carbon atoms, inclusive, and wherein R is a lower-alkyl group containing less than three carbon atoms.

12. 9,11β-epoxy-17-methyltestosterone.

References Cited in the file of this patent
UNITED STATES PATENTS 2,409,798    Reichstein _____ Oct. 22, 1946
2,707,190    Farrar _____ Apr. 26, 1955

OTHER REFERENCES

Cohn et al., Chem. and Ind. 1951.
Fried, Jour. Am. Chem. Soc. 75, 2273 (1953); Jour. Am. Chem. Soc. 76, 1455–6 (1954).